(12) United States Patent
Mayaka et al.

(10) Patent No.: US 10,975,915 B2
(45) Date of Patent: Apr. 13, 2021

(54) ASSEMBLY ALIGNMENT HANDLING DAMAGE TOLERANT SPLINE

(71) Applicant: United Technologies Corporation, Farmington, CT (US)

(72) Inventors: Charles Mayaka, Middletown, CT (US); Anthony R. Bifulco, Ellington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 739 days.

(21) Appl. No.: 15/864,292

(22) Filed: Jan. 8, 2018

(65) Prior Publication Data

US 2019/0211881 A1 Jul. 11, 2019

(51) Int. Cl.
| | |
|---|---|
| *F16D 1/10* | (2006.01) |
| *F01D 5/02* | (2006.01) |
| *F16C 3/02* | (2006.01) |
| *F16D 1/02* | (2006.01) |

(52) U.S. Cl.
CPC ............... *F16D 1/10* (2013.01); *F01D 5/026* (2013.01); *F16C 3/02* (2013.01); *F16D 1/02* (2013.01); *F05D 2230/64* (2013.01); *F05D 2240/60* (2013.01); *F16D 2001/103* (2013.01)

(58) Field of Classification Search
CPC .... F16D 2001/103; F16D 1/02; F16D 1/0858; F16D 1/10; F16D 1/101; F16D 3/02; F16D 3/06
See application file for complete search history.

(56) References Cited

U.S. PATENT DOCUMENTS

| | | | | |
|---|---|---|---|---|
| 2,015,430 | A * | 9/1935 | Matthews | B23F 5/22 464/179 |
| RE20,270 | E * | 2/1937 | Matthews et al. | F16D 3/06 464/179 |
| 3,290,918 | A * | 12/1966 | Weasler | F16D 1/10 72/340 |
| 3,396,554 | A * | 8/1968 | Westercamp | F16D 1/072 464/143 |
| 4,175,404 | A * | 11/1979 | Schopf | F16D 1/06 403/359.6 |

(Continued)

FOREIGN PATENT DOCUMENTS

JP 2013113331 6/2013

*Primary Examiner* — Daniel J Wiley
(74) *Attorney, Agent, or Firm* — Getz Balich LLC

(57) ABSTRACT

Aspects of the disclosure are directed to a gas turbine engine shaft, having an outer circumferential surface that circumscribes a central axis. The gas turbine engine shaft may comprise a plurality of splines extending along a portion of the outer circumferential surface, where each of the plurality of splines comprises an axial face that tapers from the outer circumferential surface to a spline top surface and includes a curved chamfered surface at a radially distal end of the axial face. The plurality of splines may further comprise a first sidewall and a second sidewall separated by a first spline width distance along the outer circumferential surface, where the first and second sidewalls taper inwardly from the outer circumferential surface to a second spline width along the spline top surface where the second spline width distance is less than the first spline width distance.

11 Claims, 10 Drawing Sheets

(56) References Cited

U.S. PATENT DOCUMENTS

| | | | | |
|---|---|---|---|---|
| 5,527,126 A | * | 6/1996 | Digel | B60K 17/22 403/359.6 |
| 7,374,493 B2 | * | 5/2008 | Sakurai | F16D 3/06 464/179 |
| 10,072,712 B2 | * | 9/2018 | Trombat | F16D 1/10 |
| 2008/0152424 A1 | * | 6/2008 | Igarashi | F16D 1/101 403/359.6 |
| 2009/0270187 A1 | * | 10/2009 | Matsubara | F16D 3/20 464/143 |
| 2013/0272785 A1 | | 10/2013 | Pan | |
| 2015/0125269 A1 | | 5/2015 | Bois et al. | |
| 2017/0307023 A1 | | 10/2017 | Yanagidani et al. | |

\* cited by examiner

ASSEMBLY ALIGNMENT HANDLING DAMAGE TOLERANT SPLINE

BACKGROUND OF THE INVENTION

1. Technical Field

The present disclosure relates to a gas turbine engine and, more particularly, to a spline for coupling first and second rotary components of a gas turbine engine.

2. Background Information

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

During engine assembly first and second rotating components are coupled together. This involves aligning splines of the first and second rotating components. The sharp edges of conventional splines of the first and second rotating components can lead to impact damage as splines contact when the first and second components are assembled. For example, during the known process of hunting and pecking to align the splines, impact damage to the splines may occur. The impact damage may include surface cracks and/or metal chipping at contact points. High stress concentration in these spline locations can lead to crack propagation and damage. In addition miniature metal chips resulting from the axially impacting splines of the first and second rotary components can cause foreign object debris (FOD), and improper interlocking of the splines can result in misalignment and undesirable wear.

SUMMARY OF THE DISCLOSURE

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a gas turbine engine shaft, having an outer circumferential surface that circumscribes a central axis. The gas turbine engine shaft may comprise a plurality of splines extending along a portion of the outer circumferential surface, where each of the plurality of splines comprises an axial face that tapers from the outer circumferential surface to a spline top surface and includes a curved chamfered surface at a radially distal end of the axial face. The plurality of splines may further comprise a first sidewall and a second sidewall separated by a first spline width distance along the outer circumferential surface, where the first and second sidewalls taper inwardly from the outer circumferential surface to a second spline width along the spline top surface where the second spline width distance is less than the first spline width distance.

The curved chamfered surface may taper as it extends to an axially distal end to the curved axial face.

The curved chamfered surface may have at least one radii extending between the first sidewall and the second sidewall.

The curved chamfered surface may have a compound curvature extending between the first sidewall and the second sidewall.

The spline top surface may be planar.

Each of the plurality of splines may be axially segmented and includes a first axial segment that includes the curved chamfered surface and a second axial segment axially separated from the first axial segment by a gap.

The first axial segment may be free of spline surfaces that transition at acute or obtuse angles.

The first axial segment may have a profile that is free of spline surfaces that transition at acute or obtuse angles.

According to another aspect of the present disclosure a gas turbine engine shaft coupling mechanism is provided. The gas turbine engine shaft coupling mechanism may comprise a first rotating shaft having a first shaft axial end including an outer circumferential surface that circumscribes a central axis. The gas turbine engine shaft coupling mechanism may further comprise a plurality of splines extending along a portion of the outer circumferential surface, where each of the plurality of splines comprises an axial face that tapers from the outer circumferential surface to a spline top surface and includes a curved chamfered surface at a radially distal end of the axial face. The plurality of splines may further comprise a first sidewall and a second sidewall separated by a first spline width distance along the outer circumferential surface, where the first and second sidewalls taper inwardly from the outer circumferential surface to a second spline width along the spline top surface where the second spline width distance is less than the first spline width distance. The gas turbine engine shaft coupling mechanism may further comprise a second rotating shaft having a second shaft axial end that couples to and radially surrounds the first shaft axial end.

The second rotating shaft may comprise an inner circumferential surface that circumscribes the central axis, and a plurality of second splines extend along a portion of the inner circumferential surface. Each of the plurality of second splines may comprise a second axial face that tapers from the inner circumferential surface to a second spline top surface and includes a second curved chamfered surface at a radially distal end from the inner circumferential surface. The plurality of second splines may further comprise a third sidewall and a fourth sidewall separated by a third spline width distance along the inner circumferential surface, where the third and fourth sidewalls taper inwardly from the inner circumferential surface to a fourth spline width along a second spline top surface where the fourth spline width distance is less than the third spline width distance.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
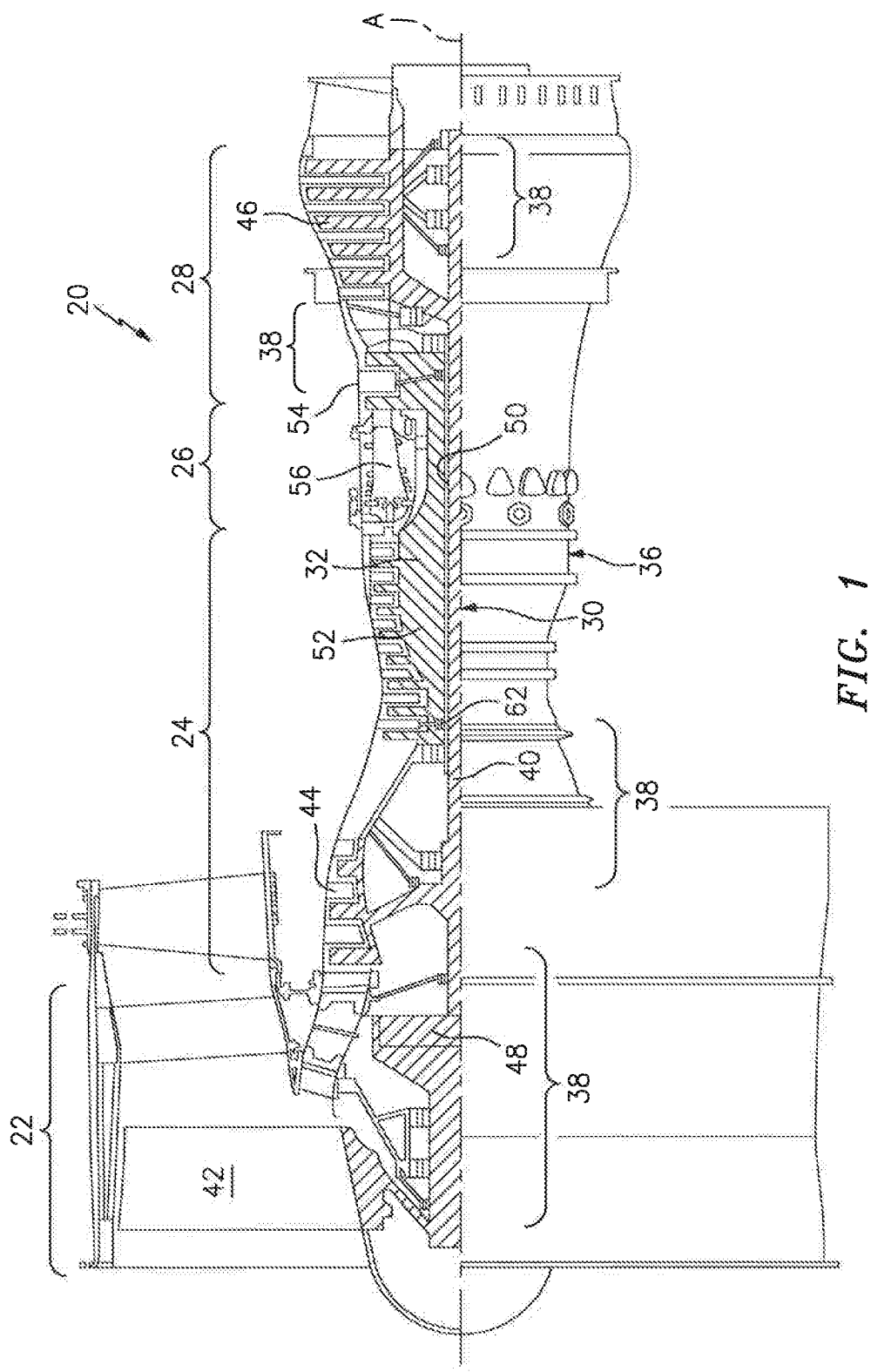
FIG. 1 schematically illustrates a gas turbine engine.

It is noted that various connections are set forth between elements in the following description and in the drawings (the contents of which are incorporated in this specification by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

Aspects of the disclosure may be applied in connection with a gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engines (not shown) might include an augmentor section among other systems or features. Although depicted as a high-bypass turbofan in the disclosed non-limiting embodiment, it should be appreciated that the concepts described herein are not limited to use only with turbofan architectures as the teachings may be applied to other types of turbine engines such as turbojets, turboshafts, industrial gas turbines, and three-spool (plus fan) turbofans with an intermediate spool.

The engine 20 generally includes a low spool 30 and a high spool 32 mounted for rotation about an engine central longitudinal axis A relative to an engine case structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and a high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The LPT 46 and the HPT 54 rotationally drive the respective low spool 30 and high spool 32 in response to the expansion.

Figure 2:
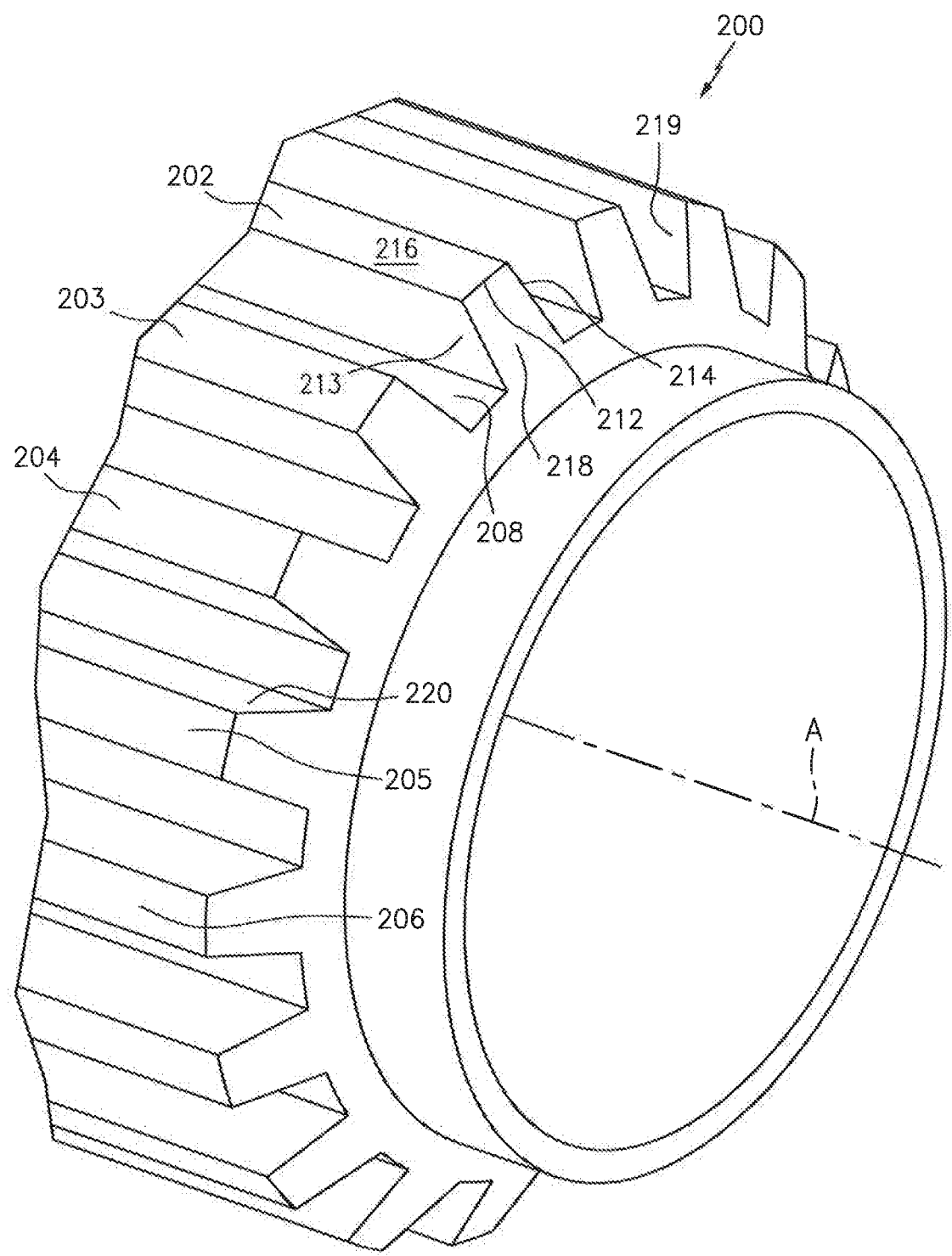
FIG. 2 is a perspective view of a rotary component that includes a plurality of conventional splines.

FIG. 2 is a perspective view of a rotary component 200 (e.g., the end of the LP shaft) that includes a plurality of conventional splines 202-206 extending along a portion of the outer circumferential surface 208. Each of the splines comprises sharp edges 212-214 transitioning between a top surface 216, front face 218 and sidewalls 219-220 of the spline. The edges transition at acute or obtuse angles, which results in the sharp edges that are prone to damage during assembly.

Figure 3:
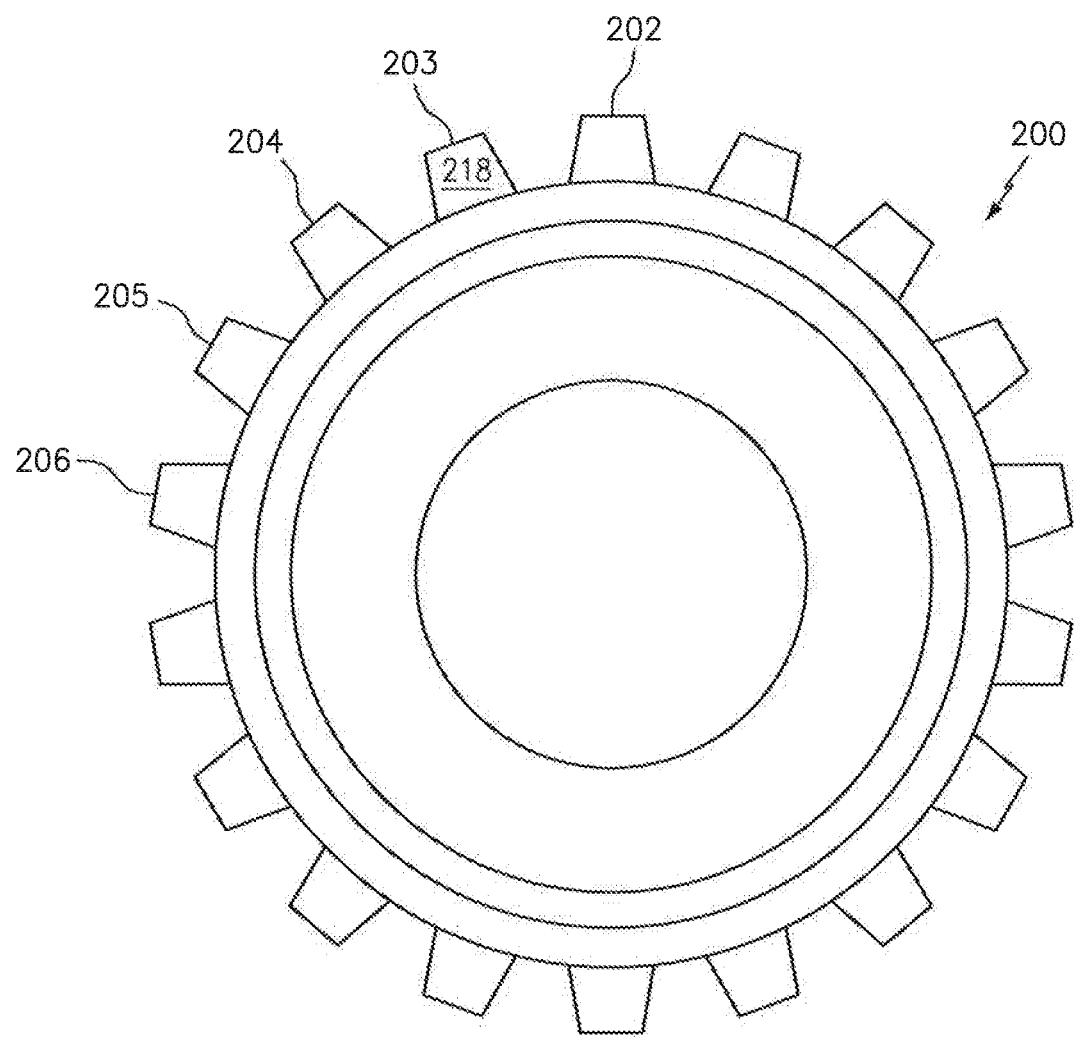
FIG. 3 is a front view of the rotary component of FIG. 2 that includes the plurality of conventional splines.

FIG. 3 is a front view of the rotary component of FIG. 2 that includes the plurality of conventional splines 202-206 equally spaced apart around the outer circumference of the rotary component.

Figure 4:
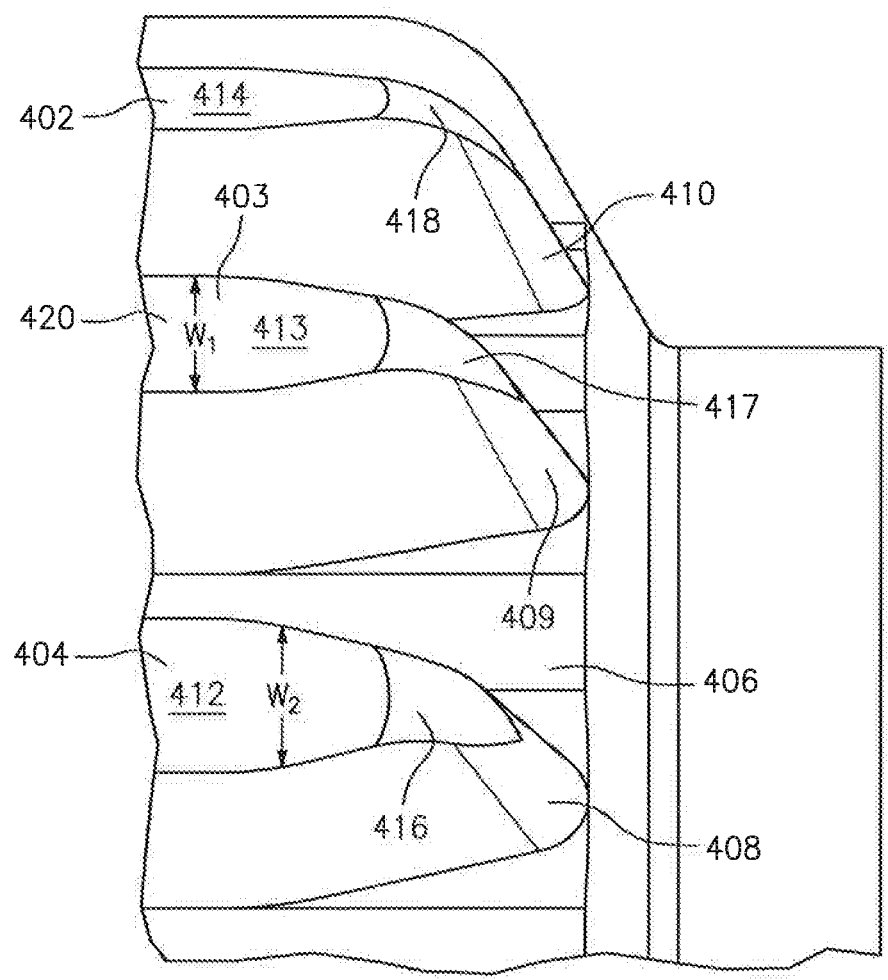
FIG. 4 is a perspective view of a plurality of splines according to a non-limiting embodiment.

FIG. 4 is a perspective view of a plurality of splines 402-404 of a rotating component according to a non-limiting embodiment. Each spline extends along a portion of an outer circumferential surface 406 of a rotary component (e.g., a LP or HP shaft). Each of the splines 402-404 comprises an associated axial face 408-410 that tapers from the outer circumferential surface 406 to a spline top surface 412-414. In contrast to the prior art illustrated in FIGS. 2-3, each axial face 408-410 includes an associated curved chamfered segment 416-418, respectively, which adjoins the respective top surface 412-414. Each curved chamfered segment provides a smooth transition (i.e., free of perceptible protrusions, lumps, edges or indentations) between its associated axial face and its respective top surface, thus avoiding the acute or obtuse angle transition of the prior art illustrated in FIG. 2. This reduces impact damage to the splines during assembly of the rotating assembly and its complementary rotating component.

In addition, each of the splines 402-404 includes a nominal width $W_1$ 420 along the top surface, which tapers down in the axial direction towards the axial face 408-410 of the spline. Width at a location in a tip region of the spline is $W_2$, which is less than the nominal width $W_1$.

Figure 5:
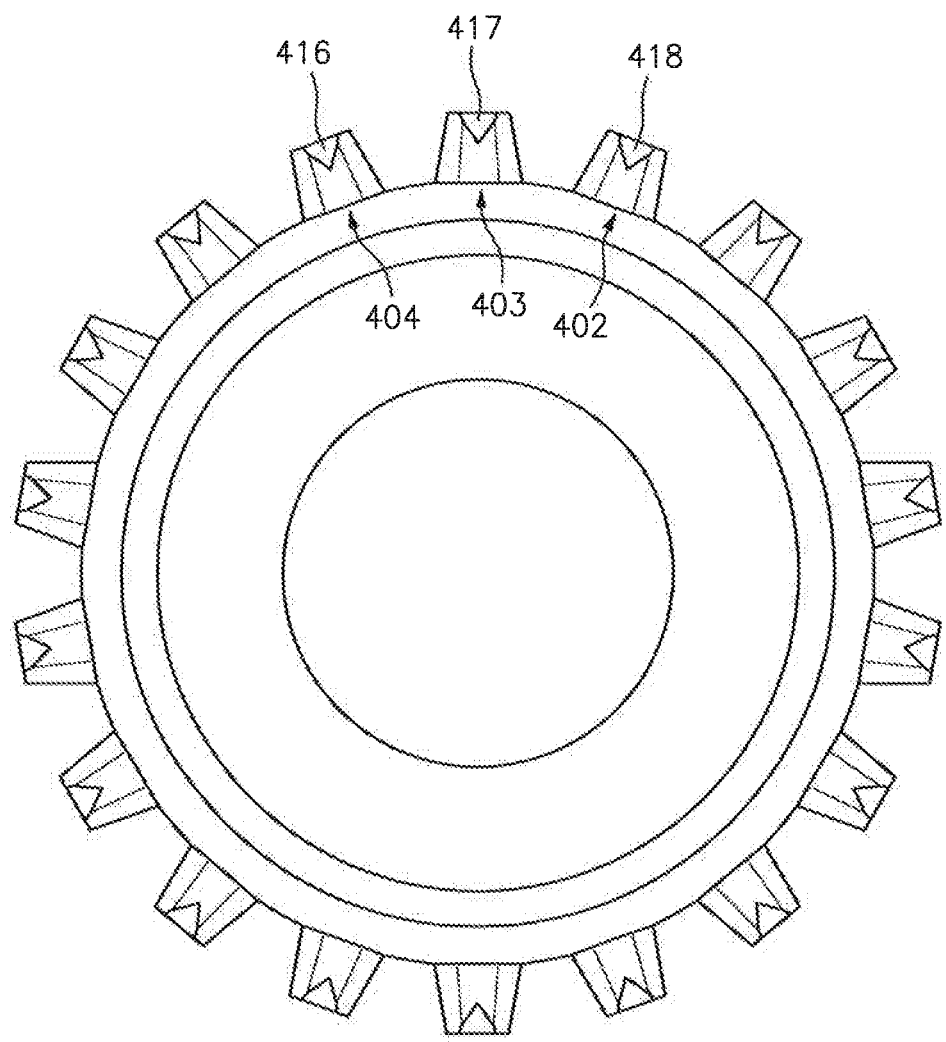
FIG. 5 is a front view of the splines illustrated in FIG. 4.

FIG. 5 is a front view of the splines illustrated in FIG. 4. The splines are equally spaced apart around the outer circumferential surface 406 of the rotary component.

Figure 6:
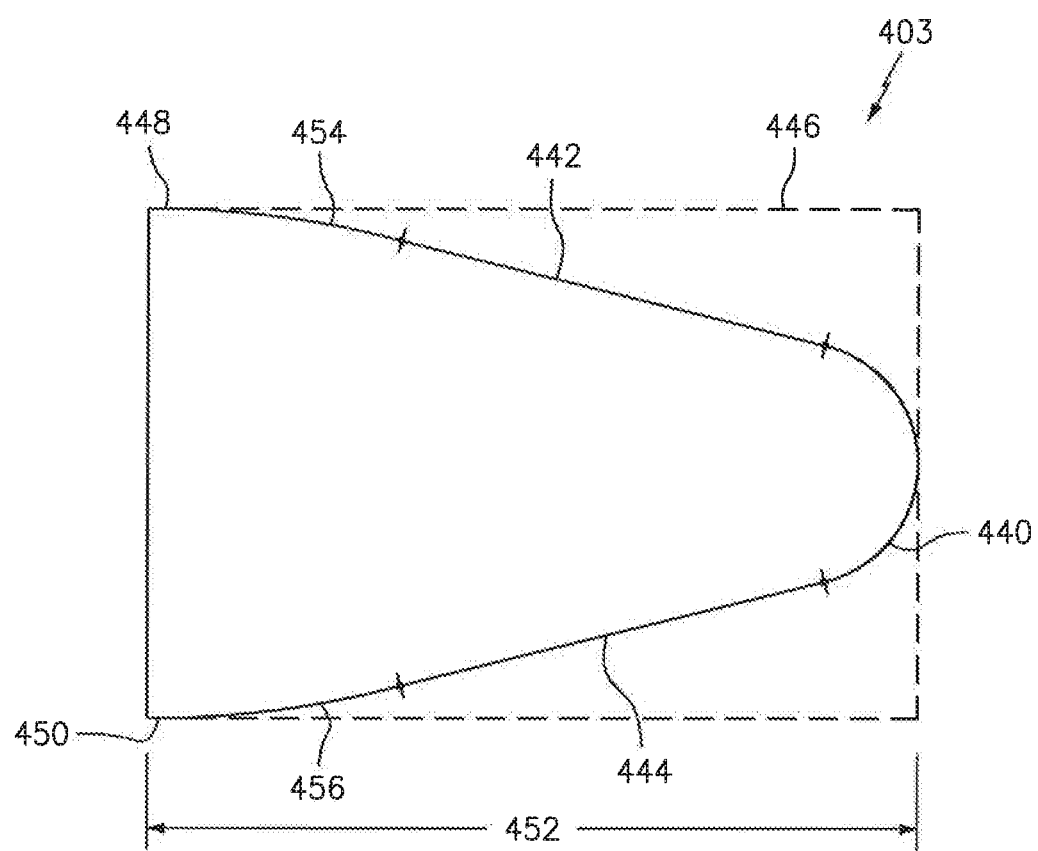
FIG. 6 is a top view illustration of a portion of one of the splines illustrated in FIGS. 4 and 5, including a tip region of the spline.

FIG. 6 is a top view illustration of a portion of the spline 403 illustrated in FIG. 4, including the tip region of the spline. In one embodiment the curved chamfered segment 417 includes a curved tip section 440 of radius of about 0.24 T, where T is the nominal width $W_1$ of the spline. The curved tip section 440 transitions to sloped sidewalls 442, 444. The sloped sidewalls 442, 444 taper inwardly at about 14-15 degrees from plane 446 of sidewalls 448, 450 at the nominal width $W_1$ of the spline. In this embodiment, the axial length 452 of the tip region (i.e., the length along the top surface from the tip to the location of nominal width $W_1$) is about 1.5 T. In addition, a curved transition region 454, 456 is provided between the sloped sidewalls 448, 450 and nominal width sidewalls separated by the nominal width $W_1$.

Figure 7:
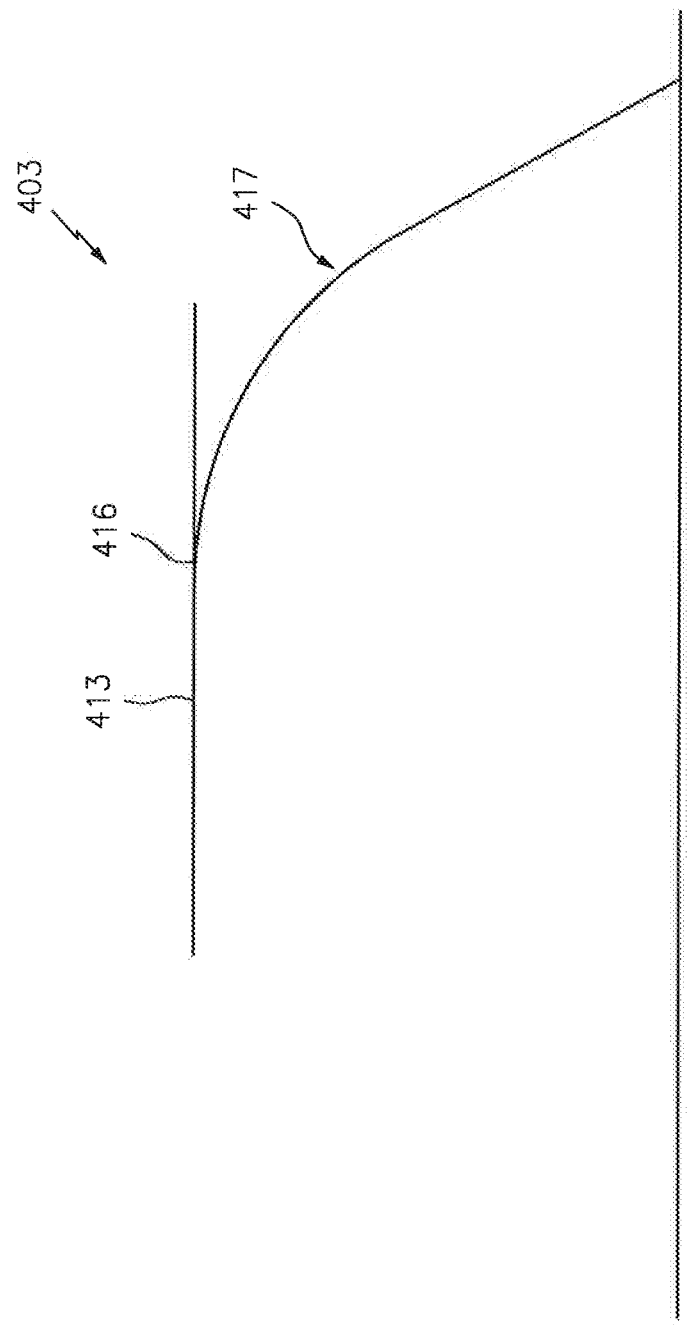
FIG. 7 is a side view of one of the splines illustrated in FIGS. 4 and 5 illustrating the curved chamfered segment in one embodiment.

FIG. 7 is a side view of the spline 403 illustrated in FIG. 4 illustrating the curved chamfered segment 417 in one embodiment. In this embodiment the radius of the curved chamfered segment 417 is about 1.0 T.

Figure 8:
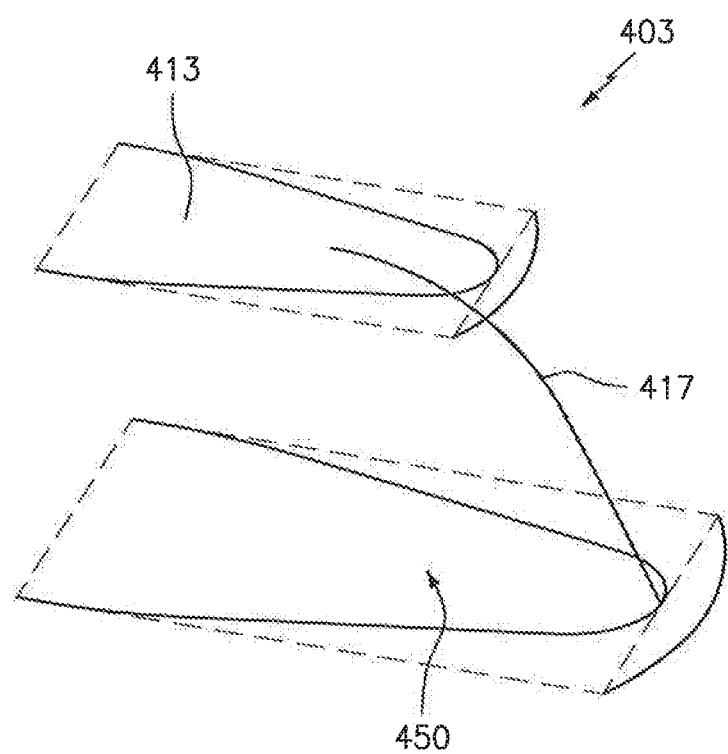
FIG. 8 is a perspective view of one of the splines illustrated in FIGS. 4 and 5 illustrating features of the spline end top surface, the spline end base surface and the face including the chamfered segment.

FIG. 8 is a perspective view of the spline 403 illustrating features of the spline end top surface 413, the spline end base surface 450 and the face including the curved chamfered segment 417.

Figure 9:
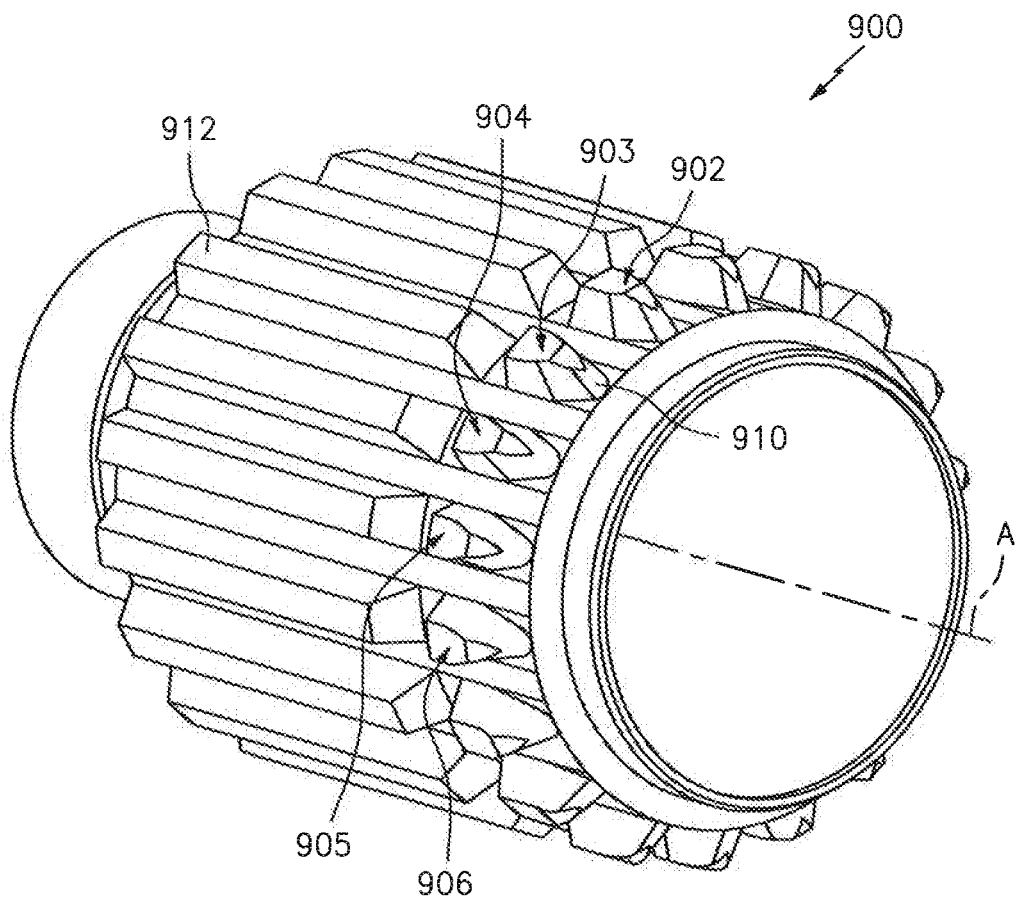
FIG. 9 is a perspective view of a plurality of splines according to another non-limiting embodiment of a first rotating component, where the spline is axially segmented into a tool segment and a working segment.

FIG. 9 is a perspective view of a plurality of splines 902-906 according to another non-limiting embodiment of a first rotating component 900. In this embodiment each spline is axially segmented into a tool segment 910 and a working segment 912. The tool segment 910 includes the spline tip region as illustrated in FIGS. 2-8, while the working segment has a constant nominal width of $W_1$. The axial length of the working segment 910 is selected to ensure proper axial alignment by the time the complementary spline of the second rotating component reaches the working spline during assembly.

Figure 10:
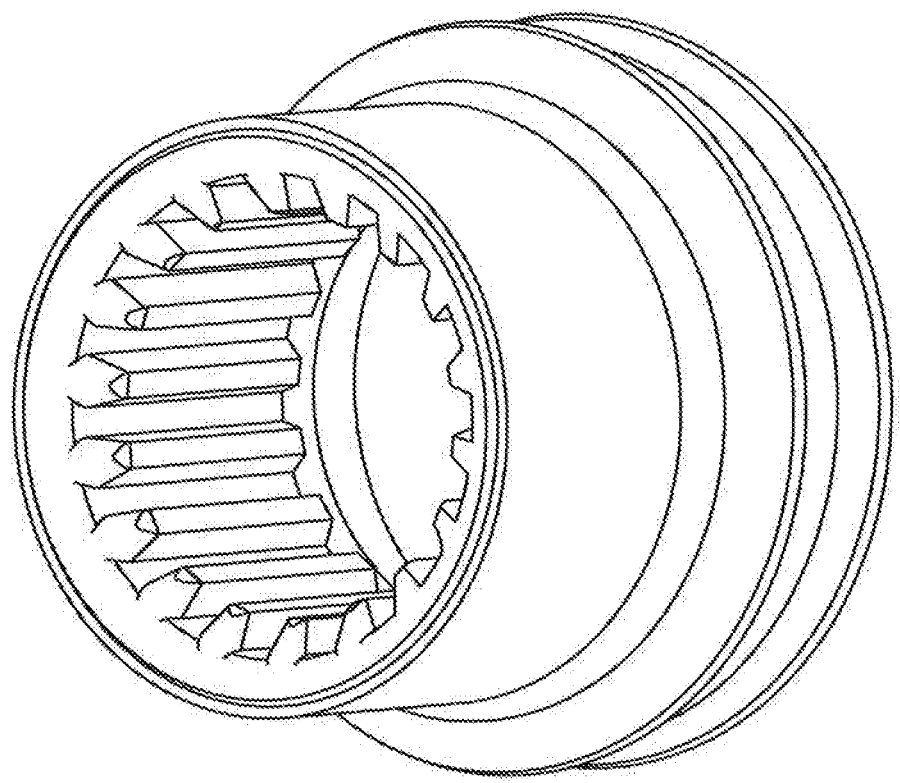
FIG. 10 is a perspective view of a second rotating component that includes a plurality of splines that rotatably engage with the splines of the first component illustrated in FIGS. 4-5.

FIG. 10 is a perspective view of a second complementary component 1000 that includes a plurality of splines that rotatably engage with the splines of the first component (e.g., see FIGS. 4, 5 and 9). The axial faces of the plurality of the splines illustrated in FIG. 10 are substantially the same as the axial faces of the splines illustrated in FIG. 4 with the exception that the splines in FIG. 10 are located on the inner diameter, while the spines illustrated in FIG. 4 are located on the outer diameter.

It is contemplated that the curved chamfered surface 417-418 may be configured to have a compound curvature, rather than the single curvature of radius about 1.0 T as illustrated in FIG. 7. Similarly, the curved tip section 440 (FIG. 6) may also be configured to have a compound curvature, rather than the single curvature of radius about 0.24 T as illustrated in FIG. 6. In one non-limiting embodiment the tip region of each spline is free of any sharp edges (e.g., edges that transition at acute or obtuse angles). This reduces the chances of damaging the complementary splines of first and second rotating components during assembly.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gas turbine engine shaft, comprising:
   an outer circumferential surface that circumscribes a central axis;
   a plurality of splines extending along a portion of the outer circumferential surface, where each of the plurality of splines comprises
      an axial face that tapers from the outer circumferential surface to a spline top surface and includes a convex curved chamfered surface at a radially distal end of the axial face; and
      a first sidewall and a second sidewall separated by a first spline width distance along the outer circumferential surface, where the first and second sidewalls taper inwardly from the outer circumferential surface to a second spline width along the spline top surface where the second spline width distance is less than the first spline width distance.

2. The gas turbine engine shaft of claim 1, where the curved chamfered surface tapers as it extends to an axially distal end to the axial face.

3. The gas turbine engine shaft of claim 2, where the spline top surface is planar.

4. The gas turbine engine shaft of claim 1, where the curved chamfered surface has at least one radii extending between the first sidewall and the second sidewall.

5. The gas turbine engine shaft of claim 1, where the curved chamfered surface has a compound curvature extending between the first sidewall and the second sidewall.

6. The gas turbine engine shaft of claim 1, where the spline top surface is planar.

7. The gas turbine engine shaft of claim 1, where each of the plurality of splines is axially segmented and includes a first axial segment that includes the curved chamfered surface and a second axial segment axially separated from the first axial segment by a gap.

8. The gas turbine engine shaft of claim 7, where the first axial segment is free of spline surfaces that transition at acute or obtuse angles.

9. The gas turbine engine shaft of claim 7, where the first axial segment has a profile that is free of spline surfaces that transition at acute or obtuse angles.

10. A gas turbine engine shaft coupling mechanism, comprising:
    a first rotating shaft having a first shaft axial end including
       an outer circumferential surface that circumscribes a central axis;
       a plurality of splines extending along a portion of the outer circumferential surface, where each of the plurality of splines comprises
          an axial face that tapers from the outer circumferential surface to a spline top surface and includes a convex curved chamfered surface at a radially distal end of the axial face; and
          a first sidewall and a second sidewall separated by a first spline width distance along the outer circumferential surface, where the first and second sidewalls taper inwardly from the outer circumferential surface to a second spline width along the spline top surface where the second spline width distance is less than the first spline width distance; and
    a second rotating shaft having a second shaft axial end that couples to and radially surrounds the first shaft axial end.

11. The gas turbine engine shaft coupling mechanism of claim 10, where the second rotating shaft comprises:
    an inner circumferential surface that circumscribes the central axis;
    a plurality of second splines extending along a portion of the inner circumferential surface, where each of the plurality of second splines comprises
       a second axial face that tapers from the inner circumferential surface to a second spline top surface and includes a second curved chamfered surface at a radially distal end from the inner circumferential surface; and
       a third sidewall and a fourth sidewall separated by a third spline width distance along the inner circumferential surface, where the third and fourth sidewalls taper inwardly from the inner circumferential surface to a fourth spline width along a second spline top surface where the fourth spline width distance is less than the third spline width distance.

* * * * *